United States Patent
Baik et al.

(10) Patent No.: US 9,682,618 B2
(45) Date of Patent: Jun. 20, 2017

(54) MANUAL EMERGENCY GAS RELEASE SYSTEM

(71) Applicant: Agility Fuel Systems LLC, Santa Ana, CA (US)

(72) Inventors: Seung W. Baik, Irvine, CA (US); Todd F. Sloan, Kelowna (CA); Jason Laycock, Kelowna (CA); Chris Forsberg, Kelowna (CA)

(73) Assignee: AGILITY FUEL SYSTEMS LLC, Santa Ana, CA (US)

( * ) Notice: Subject to any disclaimer, the term of this patent is extended or adjusted under 35 U.S.C. 154(b) by 0 days.

(21) Appl. No.: 15/014,933

(22) Filed: Feb. 3, 2016

(65) Prior Publication Data

US 2016/0229286 A1  Aug. 11, 2016

Related U.S. Application Data (60) Provisional application No. 62/112,573, filed on Feb. 5, 2015.

(51) Int. Cl.
| | | |
|---|---|---|
| *B60K 1/00* | (2006.01) | |
| *B60K 15/035* | (2006.01) | |
| *F16K 31/06* | (2006.01) | |
| *F16K 31/46* | (2006.01) | |
| *B60K 15/03* | (2006.01) | |

(52) U.S. Cl.
CPC .. *B60K 15/03519* (2013.01); *B60K 15/03006* (2013.01); *F16K 31/06* (2013.01); *F16K 31/46* (2013.01); *B60K 2015/03013* (2013.01); *B60K 2015/0319* (2013.01); *B60K 2015/03026* (2013.01); *B60K 2015/03302* (2013.01); *B60K 2015/03328* (2013.01); *B60K 2015/03375* (2013.01); *B60K 2015/03561* (2013.01)

(58) Field of Classification Search
CPC .......................... B60K 15/03519; F16K 31/06
See application file for complete search history.

(56) References Cited

U.S. PATENT DOCUMENTS

| | | |
|---|---|---|
| 5,263,824 A | 11/1993 | Waldbeser et al. |
| 5,341,844 A | 8/1994 | Wass et al. |
| 5,522,428 A | 6/1996 | Duvall |
| 5,562,117 A | 10/1996 | Borland et al. |
| 5,788,212 A | 8/1998 | Hackman et al. |
| 6,202,688 B1 | 3/2001 | Khadim |
| 6,257,360 B1 | 7/2001 | Wozniak et al. |

(Continued)

FOREIGN PATENT DOCUMENTS

| | | |
|---|---|---|
| JP | 2006-523514 | 10/2006 |
| KR | 10-2010-0048638 | 5/2010 |

OTHER PUBLICATIONS

International Search Report and Written Opinion for International Application No. PCT/US2016/016593, Notification mailed May 3, 2016.

*Primary Examiner* — John Walters
*Assistant Examiner* — James Triggs
(74) *Attorney, Agent, or Firm* — Knobbe, Martens, Olson and Bear, LLP (57) ABSTRACT

A vehicle fuel system is provided that includes a fuel tank and a manual vent system. The manual vent system includes an emergency valve and an actuator. The manual vent system is configured to cause the emergency valve to open after the actuator has been actuated.

19 Claims, 5 Drawing Sheets

(56) References Cited

U.S. PATENT DOCUMENTS

| | | |
|---|---|---|
| 6,321,775 B1 | 11/2001 | Hildebrand et al. |
| 6,382,232 B1 | 5/2002 | Portmann |
| 6,418,962 B1 | 7/2002 | Wozniak et al. |
| 6,691,683 B2 * | 2/2004 | Gracyalny ............ F02D 33/006 123/179.17 |
| 6,877,718 B2 | 4/2005 | Nimberger |
| 8,511,334 B2 | 8/2013 | Sparschuh |
| 8,550,105 B2 | 10/2013 | Ishitoya et al. |
| 8,567,757 B2 | 10/2013 | Pitchford et al. |
| 8,807,256 B2 | 8/2014 | Gibb et al. |
| 8,807,523 B2 | 8/2014 | Pitchford et al. |
| 8,844,662 B2 | 9/2014 | Tsubokawa |
| 8,915,322 B2 | 12/2014 | Gibb et al. |
| 2009/0288713 A1 | 11/2009 | Hirakata |
| 2011/0083756 A1 | 4/2011 | Hwang et al. |
| 2012/0228307 A1 | 9/2012 | Simmons |
| 2013/0112295 A1 | 5/2013 | McNicholas |
| 2014/0110613 A1 | 4/2014 | Pitchford et al. |
| 2014/0312683 A1 | 10/2014 | McNicholas |

* cited by examiner

MANUAL EMERGENCY GAS RELEASE SYSTEM

BACKGROUND OF THE INVENTION

Field of the Invention

This application relates to techniques to enhance safety of vehicles powered by fuels that are stored at high pressure.

Description of the Related Art

One approach to improve automotive emissions is to power automobiles with cleaner fuels such as natural gas. When used as an automobile fuel source, natural gas is stored in specialized tanks at high pressure. This allows an automobile powered by natural gas to have greater range. Certain precautions have been developed to address safety concerns with storing natural gas at high pressure. In one approach, a thermally activated pressure relief device (PRD) is coupled with the tank to vent the contents in the event of a fire. The PRD can open a valve to vent the canister if a thermal threshold is exceeded.

SUMMARY OF THE INVENTION

A need exists to provide an additional venting system that can be manually operated by a vehicle operator or a first responder in the case of an emergency. Such a system would further enhance safety of vehicles with high pressure fuel tanks.

In one embodiment, a manual venting system is provided that allows an operator to manually vent fuel tanks, such as compressed natural gas cylinders or liquid natural gas cylinders, in case of a fire before the thermally activated Pressure Relief Devices (PRDs) have opened. PRDs include valves based on different designs, in each case opening after being exposed to heat. Some PRDs are designed to open when the heat melts a eutectic material or a glass bulb upon reaching a predetermined temperature to provide fluid communication across the valve. Other PRDs are designed to open when a wire inside of a sheath shrinks with heat until the device reaches a pre-determined set point where the wire is activated to pull a vent valve open. In general, conventional PRDs have a lag between when heat begins to be applied and when the valve opens. In various embodiments, the operator of a vehicle would have a safety button or other actuator inside the cab of the vehicle. When the button is depressed a relief valve is opened to vent all of the gas stored inside the on board storage tanks.

In one embodiment, a vehicle fuel system is provided that includes a fuel tank and a manual vent system. The manual vent system includes an emergency valve and an actuator. The manual vent system is configured to cause the emergency valve to open after the actuator has been actuated.

In one embodiment a mechanical connection is provided between the actuator and a relief valve. The mechanical connection can be provided by a cable routed from a location inside the cab of the vehicle to the relief valve at the tank or tanks. The cable can have a first end disposed adjacent to or in the cab and a second end disposed adjacent to or on the tank. The cable preferably is protected in a sleeve that has an inner periphery greater than the outer periphery of the cable. A gap between the inner and outer periphery enables the cable to slide such that the relief valve can be actuated upon such sliding. A handle in the cab can be connected to the first end of the cable.

A cover can be provided over the handle to prevent inadvertent activation of the relief valve.

In another embodiment, an electrical signal conveyance is provided for communicating a manual signal to open a relief valve to the relief valve. The signal conveyance can include a button configured to provide a signal to an electronic control unit (ECU) of a fuel system and/or a wire connecting the button to an electromechanical device adapted to open a valve. A suitable mechanism for opening the valve can include a solenoid, for example. The button can be electrically coupled by a wire to the ECU. The button can be coupled by a wireless transmitter to the ECU. The button can be located in the cab of the vehicle with which the fuel system is coupled. The button can be accessible from outside the vehicle, for example by a first responder in the case of emergency.

Where provided, an electrical wire can be enclosed in a fire resistant structure, such as a high temperature insulator.

In certain variations, a secondary actuator can be provided. The secondary actuator can be disposed adjacent a valve to vent the tank in certain conditions. The secondary actuator can be configured to open the valve when actuated. The secondary actuator can employ a mechanism and not an electrical conveyance. For example, a lever can act on a blocking structure of a valve to move the blocking structure away from a seating surface to cause the valve to be in an open state.

In another embodiment, a vehicle is provided that includes a chassis and a fuel system. The fuel system is coupled with the chasse. The fuel system includes a fuel tank and a manual vent device. The manual vent device includes an emergency valve, an actuator, and a connector disposed between the actuator and the emergency valve actuator. The connector is responsive to actuation of the actuator to cause the emergency valve to open. The connector has an accessible portion disposed along a surface of the vehicle. Severing the connector at the accessible portion causes the emergency valve to open.

The manual venting system can be integrated into a fuel system in some embodiments. In some embodiments, the manual venting system is integrated into a vehicle. In some embodiments, the manual venting system is a separate system that can be added to vehicles already in service.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Improved venting systems and devices are disclosed herein in which users are able to activate a valve immediately to reduce pressure in or completely evacuate a fuel tank. These devices and systems can be activated when it is undesirable to wait for a conventional pressure relief device to open.

Figure 1:
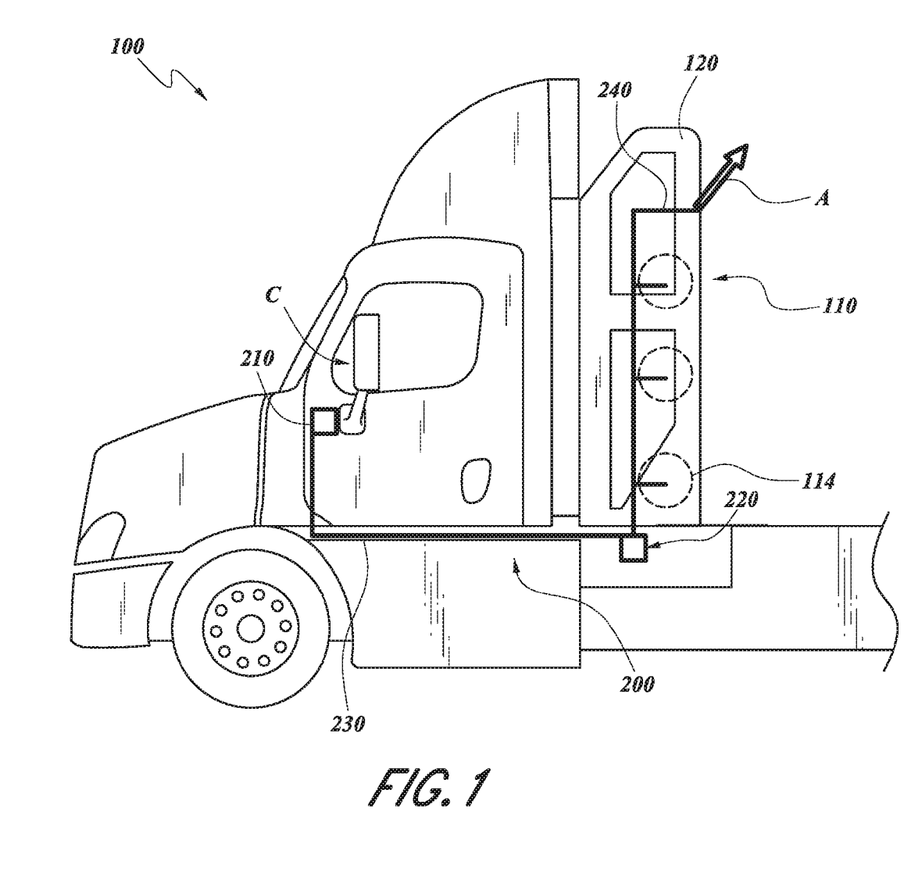
FIG. 1 is a side view of a vehicle having a fuel system mounted to the vehicle behind the cab, sometimes known as a back-of-cab mounted fuel system.

FIG. 1 is a schematic of a vehicle 100 with a fuel system 110 and a manual vent system 200 coupled therewith. The vehicle 100 may be any type of vehicle known in the art. The vehicle 100 may be a truck, such as a light duty truck (e.g., class 1, class 2 or class 3), medium duty truck (e.g., class 4, class 5 or class 6), or heavy-duty truck (e.g., class 7 or class 8). In some embodiments, the vehicles may be cars, wagons, vans, buses, high-occupancy vehicles, dump trucks, tractor trailer trucks, transit, refuse or heavy-duty vehicles, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs. In some cases, the vehicle may have a weight up to or exceeding 80,000 lbs.

Figure 2A:
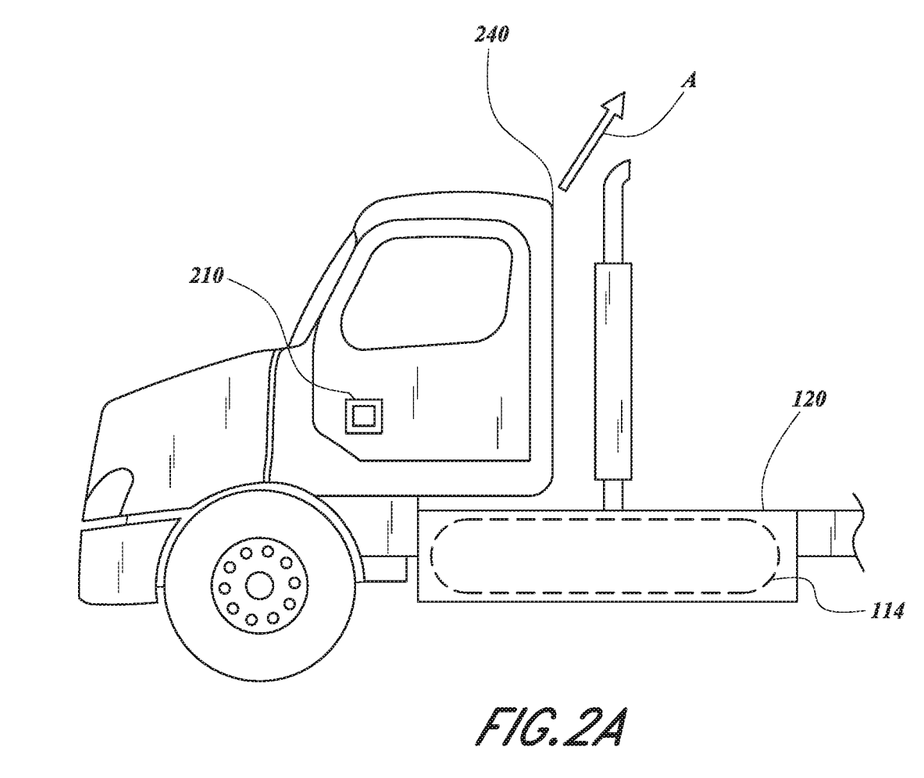
FIG. 2a is a side view of a vehicle having a rail mounted fuel system.
Figure 2B:
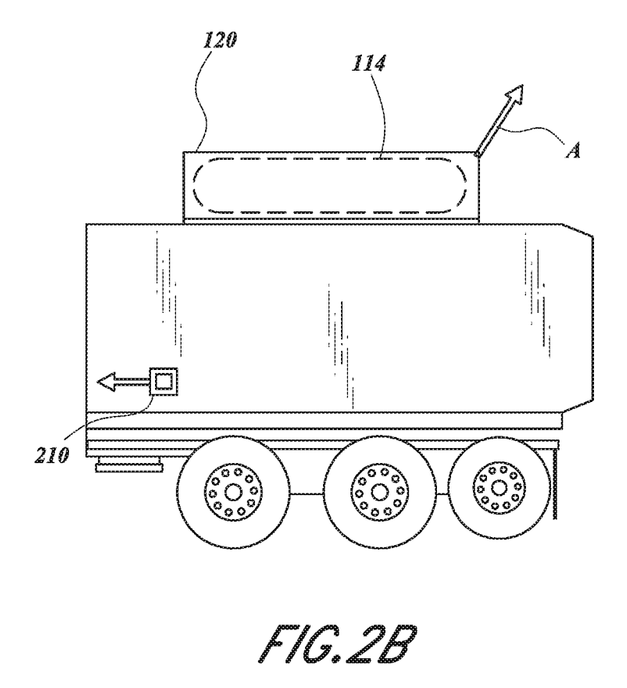
FIG. 2b is a side view of a vehicle having a roof mounted fuel system.
Figure 2C:
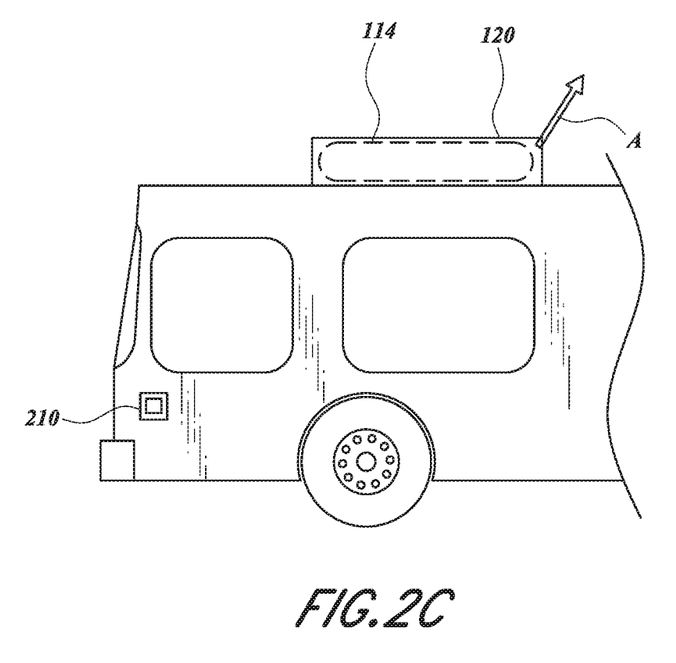
FIG. 2c is a side view of another vehicle having a roof mounted fuel system.

FIG. 1 illustrates the fuel system 110 mounted to the vehicle 100 in a behind-the-cab or back-of-cab configuration. In the behind-the-cab configuration, the fuel system 110 may be installed behind the cab C on the vehicle frame, providing, for example, standard fuel capacities, measured in diesel gallon equivalents (DGE), of 45 DGE, 60 DGE, 75 DGE or 100 DGE. In certain configurations, the fuel system 110 can be configured to provide 180 DGE or more. The fuel system 110 may be mounted to the vehicle in other configurations. For example, FIG. 2a shows a side-mount configuration with the fuel system 110 installed on the side of the vehicle frame. Fuel systems may be installed on one or both sides of the vehicle, providing, for example, standard fuel capacities of 40 DGE, 60 DGE, 80 DGE, 100 DGE, or 120 DGE or more. FIGS. 2b and 2c illustrate two examples of roof mounted systems. In further examples, the fuel system 110 may be installed in a custom integration, providing a wide range of customizable fuel capacities. In an additional example, in a front-of-the-body configuration, the fuel system 110 may be installed in front of the vehicle body, providing, for example, standard fuel capacities of 60-100 DGE. A variety of mounting locations on the vehicle frame are possible.

The vehicle 100 may be propelled by a fuel, including, but not limited to, compressed natural gas (CNG), liquefied natural gas (LNG), liquefied petroleum gas (LPG), Diesel fuel, gasoline, dimethyl ether (DME), methanol, ethanol, butanol, Fischer-Tropsch (FT) fuels, hydrogen or hydrogen-based gas, hythane, HCNG, syngas and/or other alternative fuels or fuel blends. For example, natural gas in the form of CNG or LNG may be an alternative fuel of choice for transit, refuse, and many other heavy-duty vehicles.

The fuel may be stored as a compressed gas, as a liquefied gas or as a liquid under its own vapor pressure. The fuel may be stored in the fuel system 110 comprising a fuel tank 114. The fuel tank can be a cylinder or any other type of device capable of containing a fuel in compressed gas, liquefied gas or liquid form.

The fuel tank 114 may be configured in accordance with the chosen fuel storage mode. For example, compressed gases, such as CNG, may require that the fuel tank 114 be outfitted with adequate high pressure components (e.g., high pressure seals, standard operation relief valves, compression devices), wherein high-strength and lightweight materials may allow CNG pressures up to, for example, 3,600 psig. In another example, liquefied gases, such as LNG, may require that the fuel tank 114 be outfitted with adequate liquefaction components (e.g., coolers, liquid-vapor separators, insulation). LNG systems may operate at pressures of, for example, 0 psig, 50 psig, 100 psig, 150 psig, 200 psig, 250 psig, 300 psig, or 350 psig and temperatures of, for example, −259° F., −223° F., −200° F., −186° F., −175° F., −167° F., −158° F., or −150° F., requiring the use of cryogenic (about −260° F.) piping systems and vacuum-insulated storage tanks.

In some embodiments, the vehicle 100 may include a single fuel tank 114. In other embodiments, the vehicle 100 may contain a plurality of fuel tanks 114. The tanks may or may not have the same characteristics. The tanks may be mounted to any portion of the vehicle. In some embodiments, the tanks may be mounted to a side of the vehicle. One, two, or more tanks may be mounted on a single side of the vehicle, or on each side of the vehicle. The side-mounted tanks may at least partially protrude from a side surface of the vehicle.

The one or more fuel tanks 114 may provide storage for a predetermined amount, or capacity, of fuel. For example, for natural gas measured in diesel/gasoline gallon equivalents (where 1 gasoline gallon equivalent (GGE)=standard cubic feet (SCF) of natural gas divided by 123, and 1 diesel gallon equivalent (DGE)=standard cubic feet (SCF) of natural gas divided by 139), the amount of fuel provided on board the vehicle may be, for example, up to about 28 DGE, 45 DGE, 52 DGE, 60 DGE, 63 DGE, 70 DGE, 75 DGE, 80 DGE, 88 DGE, 92 DGE, 140 DGE, 100 DGE, 105 DGE, 120 DGE, 140 DGE, 160 DGE, 176 DGE, or more than 176 DGE.

The fuel tank 114 may have any size and/or weight. For example, the fuel tank may be larger than, smaller than, or about the same size as a 5 gallon tank, 7 gallon tank, 10 gallon tank, 15 gallon tank, 20 gallon tank, 25 gallon tank, 30 gallon tank, 40 gallon tank, 50 gallon tank, 70 gallon tank, 90 gallon tank, 110 gallon tank, 130 gallon tank, 150 gallon tanks, or 170 gallon tank. The fuel tank may weigh more than, less than, or equal to about 0.01 tons, 0.03 tons, 0.05 tons, 0.07 tons, 0.1 tons, 0.2 tons, 0.3 tons, 0.5 tons, 0.7 tons, or 1.0 tons. For example, the fuel tanks may be of cylindrical form with dimensions (radius in inches×length in inches) of, for example, 25"×39", 25"×61", 25"×80", 25"× 90", 26"×80", 26"×90", 26"×120", 26"×76", 16"×80", 21"× 86", 16"×120", 21"×70", 21"×86", and one or more cylinders may be combined to achieve a predetermined total fuel capacity.

The fuel system 110 may be capable of containing a fuel at a predetermined pressure. For example, the fuel system 110 may be capable of containing a fuel having a pressure of less than or equal to about 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less. Optionally, the fuel system may be structurally capable of containing a fuel having a high pressure value, such as at least the pressure values described above.

In embodiments requiring cooling and/or insulation, such as in LNG fuel systems, the fuel system components may be appropriately outfitted with insulation, chillers and/or other components known in the art. For example, the fuel transfer lines and the fuel tank 114 may be wound with insulation.

The fuel system 110 may have one or more fuel outputs. The fuel output may transfer the fuel to another part of the vehicle 100, such as an engine. In one example, the fuel may be output to mix with air in the cylinder of an engine. The system 200 provides a novel output that can be employed in an emergency situation as discussed herein.

The fuel system 110 may be housed in a cover 120, which may be mounted to the vehicle, and may serve to contain and protect the fuel tank 114 and other fuel system components. The cover 120 may be made of a variety of materials, including, but not limited to, metal or metal alloys (e.g., steel, iron, aluminum, titanium, copper, brass, nickel, silver, or any alloys or combinations thereof), composite materials (e.g., carbon fiber, fiberglass), or polymer materials. The cover 120 may be made of a single material or may comprise multiple pieces made of different materials. The fuel system 110 may be partially housed in the cover 120. In some embodiments, one or more components of the fuel system 110 or the venting system 200 may reside outside of the cover 120. For example, the fuel distribution system components may reside partially inside and partially outside of the cover 120, or fully outside (e.g., within the body of the vehicle) of the cover 120.

The manual venting system 200 is provided to improve safety in an emergency situation. The system 200 allows an operator to manually vent the fuel tanks 114. The activation advantageously can be before a pressure relief device has been thermally activated. The system includes an actuator 210 located inside the cab C of the vehicle 100. The actuator 210 is configured to cause a control valve 220 to open when the operator engages the venting system.

The actuator 210 can operate a cable system 230 that is routed from a location inside the cab C of the vehicle to the control valve 220 at or adjacent to the tank or tanks 114. The cable system 230 can have a first end disposed adjacent to or in the cab C and a second end disposed adjacent to or on the tank or tanks 114. The cable system 230 preferably includes a protective member that maintains the operability of a cable thereof. For example, a tubular body can be provided that has an inner periphery greater than the outer periphery of a cable disposed in the tubular body. A gap between the inner and outer periphery enables the cable to slide such that the control valve 220 can be actuated upon such sliding.

The actuator 210 can take any suitable form, for example including rigid member rotatable about an axle having the first end of the cable mounted thereto at a location eccentric to the axis of rotation of the rigid member. The rigid member can be in the form of a handle. Other mechanical actuators can be provided, such as a button that can be depressed to engage the cable or a toggle device or other mechanical device.

A cover can be provided over the handle to prevent inadvertent activation of the relief valve.

Conventionally, in the event of a fire a pressure relief device is provided that is thermally activated. Because the pressure relief device relies on heat melting or otherwise altering a structure of the valve, there is a delay in the opening of the valve. In a situation where the operator is certain that the tank needs to be vented, the manual vent system 200 allows the immediate or short delay venting of gas. Instead of waiting critical seconds or minutes for a vent to occur, the operator would engage the actuator 210 to guarantee the vent as indicated by the arrow A. In the embodiments of FIGS. 1 and 2a, the venting occurs from the top of a stack 240 connecting the tanks(s) 114 to a location above the vehicle. In the embodiments of FIGS. 2b and 2c the venting occurs from the top of the cover 120 or directly from the tanks or the same level as the tanks, making the stack optional in these embodiments.

In one variation, the actuator 210 and/or the cable system 230 can be configured to provide a time lag between actuating the actuator and the opening of the valve 220. In one embodiment, the actuator 210 can be thermally activated. In one embodiment, a wire that shrinks upon being heated can be provided inside the cover to cause the cable in the cable system 230 to move such that the control valve 220 opens. The thermal activation can be one that provides a much shorter lag time than a typical PRD, thus providing quicker activation than a PRD but providing needed time for an operator or those around the vehicle 100 time to get away from the vehicle. The time delay is preferably less than the lag in a conventional pressure relief device, but long enough to permit the operator or other persons near the vehicle to get to a safe radius. For example, a time lag of 10 or more seconds, of 20 or more seconds, or of 30 or more seconds can be provided. In certain embodiments a time lag of about a minute or more can be provided.

In one variation, the manual vent system 200 is mechanically operated and is configured to be bypassed by an emergency responder. For example, a label or other indicator can be provided on or near the cable system 230 indicating that a cable therein actuates a manual relief valve. The emergency response personnel can cut the cable system 230 and pull or release the cable therein to open the valve. This provides manual activation of the manual vent system 200 from a location outside the cab C. It is also a manual override of the system 200 that can allow venting without entering the cabin C. An emergency first responder can override the system 200 to trigger or activate the emergency valve. In one variation, the time lag component of the device is located close to the valve 220 so that even when the cable system 230 is cut the first responder is given time to evacuate the immediate area before the venting occurs.

In another embodiment, the manual venting system 200 is configured to provide a signal to the valve 220 when the actuator 210 is actuated. The actuator 210 can be connected to the valve 220 by a wire for communicating a manual signal to open the valve 220. In one embodiment, the actuator 210 is a button that is electrically coupled with a controller such as an electronic control unit (ECU) of the fuel system 110. The button can be electrically coupled by a wire to the ECU. The button can be electrically coupled by a wireless transmitter to the ECU. The button can be located in the cab of the vehicle with which the fuel system is coupled.

In one variation, the manual vent system 200 is electrically operated and is configured to be bypassed by an emergency responder. For example in the case of a wirelessly operated system, the first responder can have a device capable of sending a signal to open the valve directly to a controller, the ECU, or the valve 220 to cause the valve 220 to open. The wireless connection can be by any known wireless technology. The opening of the valve 220 can be immediate or on a suitable lag. In one variation, the emergency responder can specify the lag time based on how much time is needed to clear the area.

There have been a many situations around the world where mechanical or thermally activated PRD's do not perform as intended resulting in catastrophic detonation of cylinders. The manual venting system 200 provides a way to avoid such events.

Figure 3:
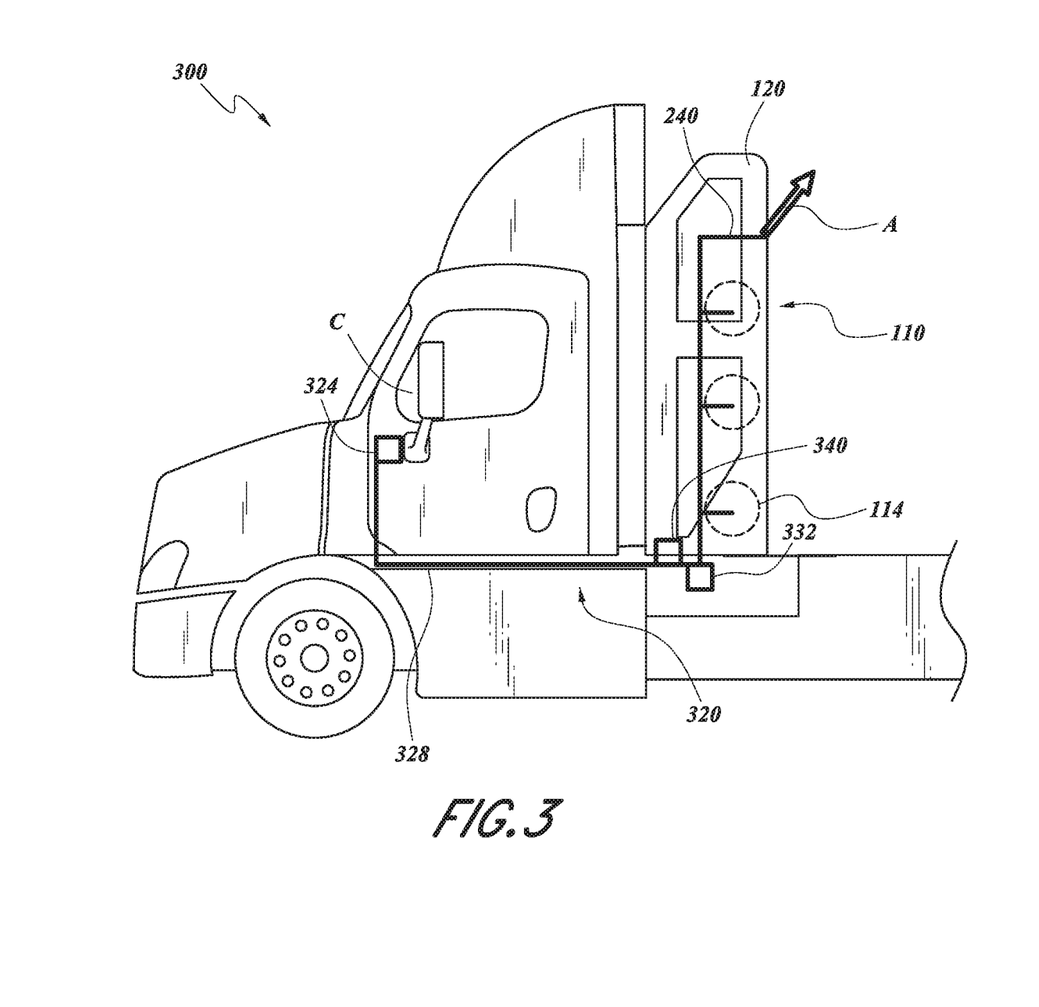
FIG. 3 is an alternative embodiment with a primary release mechanism and a secondary release mechanism.

FIG. 3 illustrates another embodiment of a vehicle 300 that can have a fuel system 310 and a vent system 320. The vehicle 300 and the fuel system 310 can be similar to vehicle 100 and the fuel system 110 except as described differently below. The vent system 320 can have a primary vent actuator 324 that is disposed on or in the cab C of the vehicle 300. The vent actuator 324 can be a button disposed within the reach of the driver as discussed above. The vent actuator 324 can operate on any principle. In the illustrated embodiment, actuating the actuator 324 causes an electrical signal to pass along an electrical wire 328 that extends from a first end coupled with the actuator 324 to a second coupled with a valve 332. The valve 332 can be similar to the valve 220. In either case, the valve can include a mechanism to cause a blocking structure to move aside allowing gas in the fuel system 110, 310 to exit the system. The mechanism can include any known structure for moving a blocking structure, such as a solenoid. Because one application of the systems described herein is to contend with an emergency situation such as a fire, the electrical wire 328 preferably is disposed in a fire resistant structure. The electrical wire 328 can include or be enclosed in an insulator that is rated to a temperature higher than a typical vehicle fire such that a fire will not destroy the electrical wire 328.

In some embodiments, the vent system 320 includes a secondary actuator 340 disposed adjacent to the valve. The secondary actuator 340 can be a mechanical actuator. A mechanical actuator is advantageous in that if the electrical wire 328 is damaged for any reason, the mechanical actuator can open the valve 332. A mechanical actuator can include a lever, an over-center mechanism, a cam or other direct action mechanism, that pushes a blocking structure of the valve 332 to an open position.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A vehicle fuel system, comprising:
   a fuel tank; and
   a manual vent system, comprising:
      an emergency valve; and
      an actuator;
   wherein the manual vent system is configured to cause the emergency valve to open after the actuator has been actuated, and
   wherein a mechanical connection is provided between the actuator and the emergency valve such that movement of the actuator moves the mechanical connection to cause the valve to open.

2. The vehicle fuel system of claim 1, wherein the mechanical connection comprises a cable disposed in a sheath.

3. The vehicle fuel system of claim 1, wherein the mechanical connection comprises a time lag to delay the opening of the valve.

4. The vehicle fuel system of claim 1, wherein the mechanical connection is configured such that if severed the emergency valve is caused to open.

5. A vehicle fuel system, comprising:
   a fuel tank; and
   a manual vent system, comprising:
      an emergency valve; and
      an actuator;
   wherein the manual vent system is configured to cause the emergency valve to open after the actuator has been actuated, and
   wherein an electrical connection is provided between the actuator and the emergency valve such that movement of the actuator causes a signal to be sent to a controller that causes the valve to open.

6. The vehicle fuel system of claim 5, wherein the controller is configured to provide a time lag to delay the opening of the valve.

7. The vehicle fuel system of claim 5, wherein a signal provided along the electrical connection actuates a mechanism disposed adjacent to the valve to open the valve.

8. The vehicle fuel system of claim 7, wherein the mechanism disposed adjacent to the valve comprises a solenoid.

9. The vehicle fuel system of claim 5, wherein the electrical connection is disposed in a fire resistant structure.

10. The vehicle fuel system of claim 5, further comprising a secondary actuator disposed adjacent the valve, the secondary actuator configured to open the valve when actuated.

11. The vehicle fuel system of claim 5, wherein the controller is adapted to receive a wireless signal and in response to cause the valve to open.

12. The vehicle fuel system of claim 11, wherein the controller is adapted to provide a time lag to delay the opening of the valve.

13. The vehicle fuel system of claim 12, wherein the time lag is selectable by the actuator.

14. A vehicle comprising:
   a chassis; and
   a fuel system coupled with the chasse, the fuel system comprising:
      a fuel tank; and
      a manual vent device comprising an emergency valve, an actuator, and a connector disposed between the actuator and the emergency valve actuator, the connector responsive to actuation of the actuator to cause the emergency valve to open, the connector having an accessible portion disposed along a surface of the vehicle;
   wherein severing the connector at the accessible portion causes the emergency valve to open.

15. The vehicle of claim 14, wherein the connector comprises a mechanical connection disposed between the actuator and the emergency valve.

16. The vehicle of claim 14, wherein the connector comprises an electrical wire configured to convey current between the actuator and a controller.

17. The vehicle of claim 16, wherein a signal provided along the electrical wire actuates a solenoid disposed adjacent to the valve to open the valve.

18. The vehicle fuel system of claim 16, wherein the electrical wire is disposed in a fire resistant structure.

19. The vehicle fuel system of claim 16, further comprising a mechanical actuator disposed at the valve and coupled with the valve to open the valve in the event the electrical wire is compromised.

* * * * *